United States Patent [19]
Monteleone

[11] 3,721,507
[45] March 20, 1973

[54] BLADE FOR HIGH SPEED HELICOPTER

[75] Inventor: Robert A. Monteleone, Monroe, Conn.

[73] Assignee: United Aircraft Corporation, East Hartford, Conn.

[22] Filed: Sept. 22, 1971

[21] Appl. No.: 182,776

[52] U.S. Cl. ................................ 416/223, 416/228
[51] Int. Cl. ............................................. B64c 27/46
[58] Field of Search........416/223, 228, 237, 18, 144, 416/238

[56] References Cited

UNITED STATES PATENTS

| | | | |
|---|---|---|---|
| 2,475,337 | 7/1949 | Platt | 416/144 |
| 3,065,933 | 11/1962 | Williams | 416/228 X |
| 3,173,490 | 3/1965 | Stuart | 416/223 |
| 3,392,788 | 7/1968 | Covington et al. | 416/226 X |
| 3,399,731 | 9/1968 | Giles | 416/228 |

Primary Examiner—Everette A. Powell, Jr.
Attorney—Vernon F. Hauschild

[57] ABSTRACT

To alleviate a helicopter blade instability which manifests itself as a submiltiple oscillation of the rotor tip path plane during high speed flights, the blade tip is thinned between its inboard end and its outboard end so that the outboard end is approximately one half the thickness of the inboard end, while the tip chord remains substantially constant, and the blade tip is swept rearwardly to shift its aerodynamic center rearwardly and thereby establish a moment to counteract the instability and preferably, the blade tip is selectively cambered to delay retreating blade stall.

27 Claims, 5 Drawing Figures

PATENTED MAR 20 1973
3,721,507
SHEET 1 OF 2
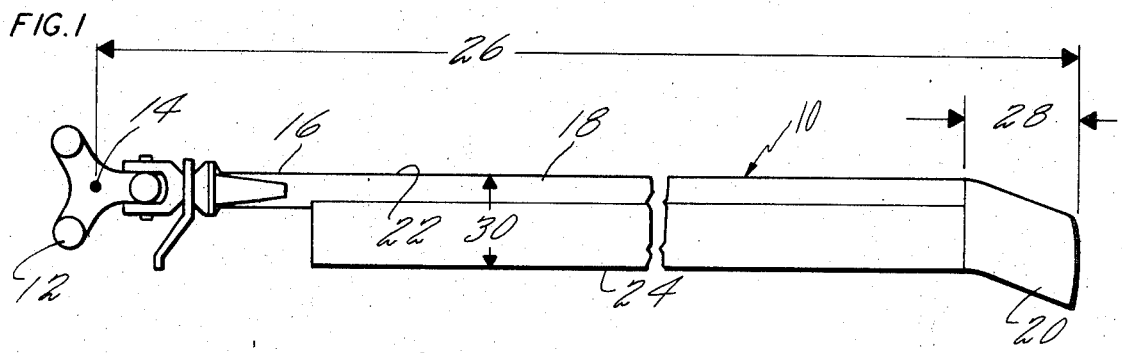
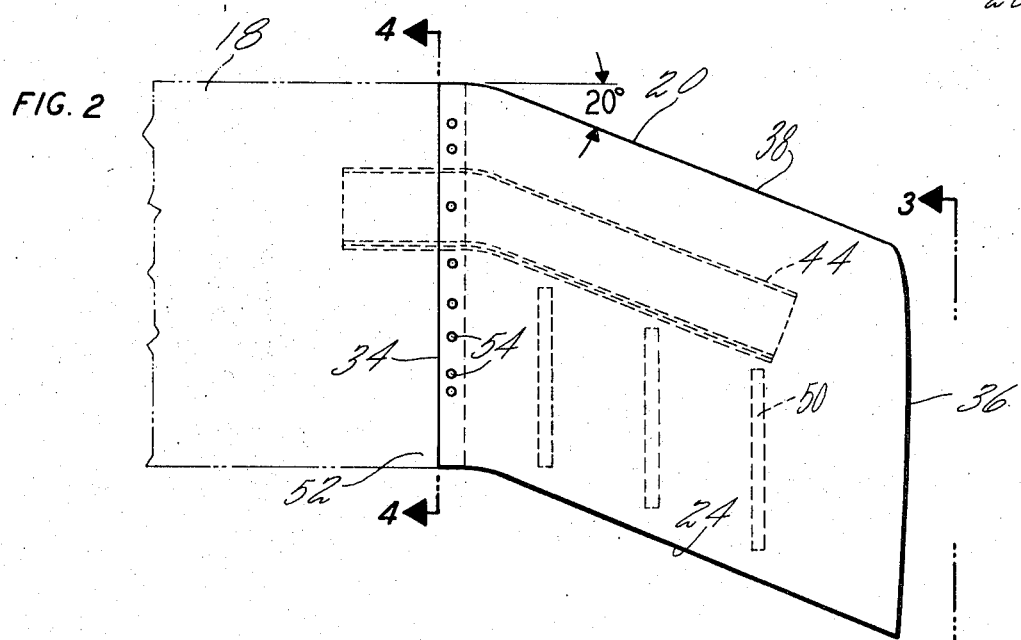
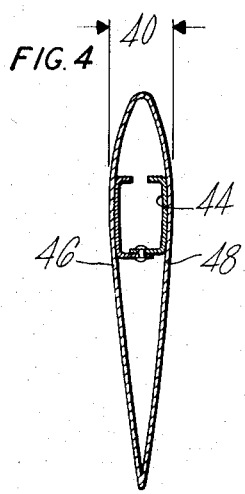
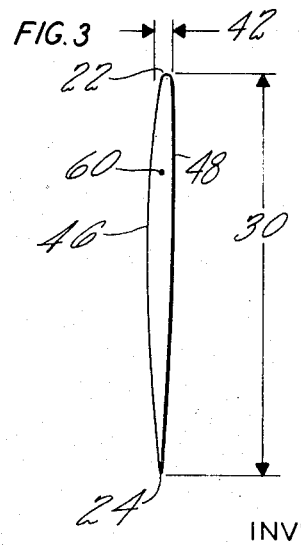
INVENTOR
ROBERT A. MONTELEONE
BY *Vernon F. Hauschild*
ATTORNEY

3,721,507

BLADE FOR HIGH SPEED HELICOPTER

CROSS-REFERENCE TO RELATED APPLICATIONS

Some of the subject matter of this application is disclosed and claimed in the copending applications of David T. Balch entitled "Helicopter Blade" (Ser. No. 182,777) and W. Donald Jepson entitled "Helicopter Blade", (Ser. No. 182,618) filed on even date herewith.

BACKGROUND OF THE INVENTION

1. Field of the Invention

This invention relates to helicopter blades and more particularly to the alleviation of instability in a helicopter blade which is experienced during high speed helicopter flight.

2. Description of the Prior Art

The advent of high speed helicopter flight where advancing tip Mach number approaches unity is quite recent and therefore few people have addressed themselves to the problem of eliminating the rotor instability of concern herein.

R. F. Spivey et al. U.S. Pat. No. 3,467,197 addresses the Mach rise problem but not the stability problem and does so by merely varying the contour of the helicopter blade tip leading edge. Spivey therefore does not achieve the rearward shifting of the aerodynamic center of the blade tip to produce the correcting moment achieved herein, in fact, both the Spivey patent and the 1963 publication referred to therein, avoid shifting the aerodynamic center so as to refrain from imposing additional loads on the helicopter rotor control rods. Contrary to the teaching of Spivey, we teach the shifting of the blade aerodynamic center to produce blade stabilizing moments.

Giles U.S. Pat. No. 3,399,731 teaches a helicopter blade with a rearwardly swept and tapered tip, however, it should be noted that Giles does not teach blade tip thinning (i.e., thickness to chord ratio reduction nor the tip camber teaching contained herein, nor does he specify the amount of rearward sweep of the blade tip. It would appear from the drawing of Giles that his blade tip is swept rearwardly well over 45° and such a construction would produce harmful results in the form of excessive rotor control rod loads and the reduction in area per unit span would have a detrimental effect on retreating blade stall. Contrary to the teachings of Giles, we do not taper our blade tip since we do not wish to lose effective blade tip area nor do we sweep our blades rearwardly to the extent that Giles does so as to avoid increasing related problems beyond the tolerable level.

SUMMARY OF THE INVENTION

A primary object of the present invention is to fabricate a tip portion of a helicopter blade so as to alleviate blade instability at high speed flight which manifests itself as a submultiple oscillation of the rotor tip path plane.

In accordance with the present invention, a blade tip is utilized which is swept rearwardly approximately 20° with respect to the remainder of the blade, which is of substantially constant chord dimension, which is substantially uniformly thinned between its inner end (approximately 94 percent radius) and its outer end (100 percent radius) so that the outer end is approximately one half the thickness of the inner end of the blade tip, and so that the blade tip portion is untwisted or selectively twisted.

In accordance with the present invention, the rearwardly swept helicopter blade tip is of a thickness at its inner end of about 12 percent of the chord dimension and is of a thickness at its outer end or tip of about 6 percent of the chord dimension.

In accordance with a further aspect of the present invention, the inner end of the blade tip portion is of a specific symmetrical airfoil cross section and the outer end or tip of the blade tip portion is of a selected cross-sectional shape including a specified camber to prevent blade stalling on the retreating blade.

It is still a further object of this invention, to not only alleviate the aforementioned instability at high speed flight, but to reduce the rotor power required at high Mach number and reduce the rotor noise.

BRIEF DESCRIPTION OF THE DRAWINGS

FIG. 1 is a plan view of the helicopter blade utilizing this invention.

FIG. 2 is an enlarged plan view of the blade tip, with inner support members shown in phantom and illustrating the connection of the blade tip to the remainder of the blade.

FIG. 3 is a view taken from line 3—3 and illustrates the cross-sectional shape of the outer end or tip of the blade tip portion.

FIG. 4 is a view taken from line 4—4 and illustrates the cross-sectional shape of the inner end of the blade tip portion.

DESCRIPTION OF THE PREFERRED EMBODIMENT

Figure 5:
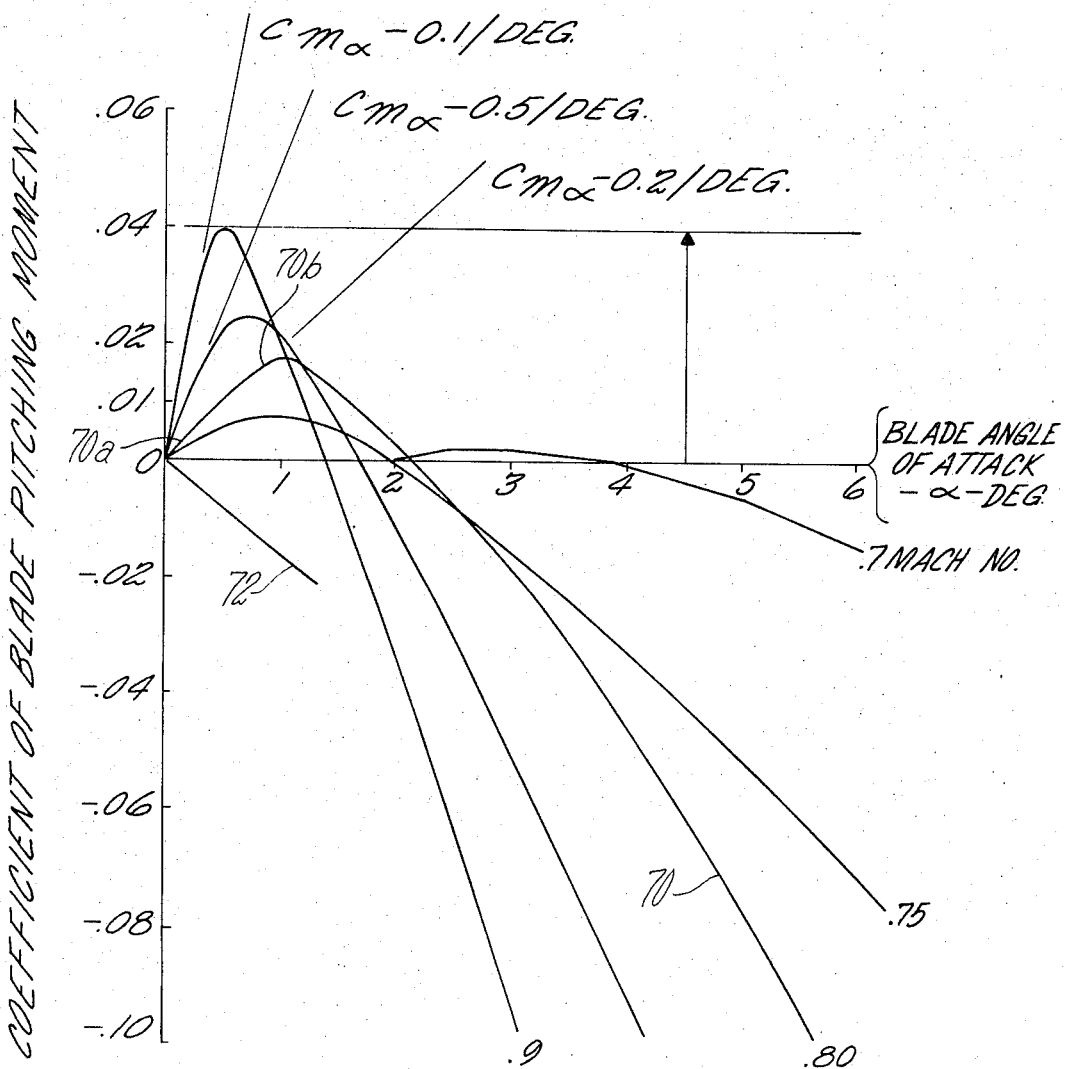
FIG. 5 is a graphic illustration of the instability of concern herein and illustrates how this instability is alleviated by the use of this blade construction.

My high speed helicopter rotor blade is shown in FIG. 1 to comprise blade 10 projecting from and connected to hub 12 so as to be rotatable therewith about rotor axis of rotation 14 and to coact with a plurality of similar, and preferably identical, blades to form the helicopter lift rotor. Blade 10 may be of the type more fully described in U.S. Pat. No. 2,754,917 and consists of root section 16, which is attached to the rotor hub 12 in conventional fashion, central and main lift portion 18, which projects radially outwardly from the root portion 16, and tip portion 20, to which my invention particularly relates. Blade 10 includes leading edge 22, trailing edge 24, and is of airfoil cross section so as to create lift for helicopter operation during rotation. The blade span is indicated by reference numeral 26, the tip portion span is indicated by reference numeral 28, and the blade end tip chord is indicated by reference numeral 30.

As previously stated, the inventive concept disclosed herein lies in the fabrication and shape of blade tip portion 20, which is shown in greater particularity in FIGS. 2 through 4.

As best shown in FIG. 2, tip portion 20 is of span dimension 28 and chord dimension 30 and includes inboard end 34, outboard or tip end 36 and central section 38, together with leading edge 22 and trailing edge 24. Tip portion 20 preferably contains no twist, or is selectively twisted.

For purposes of high speed instability alleviation, swept tip portion 20 is swept rearwardly with respect to central portion 18 approximately 20° for reasons to be described in greater particularity hereinafter. The range of rearward sweep is 20°±5°.

In addition to rearward sweep, tip portion 20 is also fabricated so as to be thicker at its inner end 34 than at its outer end 36 and to be of selected cross-sectional shape at each. As best shown in FIG. 3, the cross-sectional shape of the tip end 36 is of selected contouring and may be defined as NACA/S 13006-.72. The significance of this designation will be described in greater particularity hereinafter. The cross-sectional shape of tip portion 20 at inboard end 34 is shown in FIG. 4 to be of symmetrical shape and to be definable as NACA 0012. This is also preferably the cross-sectional shape of blade central portion 18, also. FIGS. 3 and 4 demonstrate the fact that tip portion 20 thins appreciably between its inboard end 34 and its tip 36. To be specific, the thickness at inboard end is designated by reference numeral 40 and is preferably about 12 percent of the constant chord dimension 30. The thickness of tip 36 is designated by reference numeral 42 and is substantially one half the thickness of the inboard end 34, or about 6 percent of the constant chord dimension 30. The span 28 of tip portion 20 is preferably 6 percent of blade span 26, which is 22 inches in our preferred embodiment.

Structurally, tip portion 20 includes spar or support member 44, which extends for the full thickness of the airfoil shape and is preferably C-shaped and connected to both the upper wall 46 and the lower wall 48 thereof by any convenient means, such as riveting, welding, bonding or mechanical fastening. Tapering rib members, such as 50, extend rearwardly or toward trailing edge 24 from support 44 and are selectively shaped to cooperate with support 44 and top surface 46 and bottom surface 48 of blade tip portion 20 to define a cross section of airfoil shape. Preferably, the skin which defines top and bottom surfaces 46 and 48 is sleeved over the outboard end 52 of blade central portion 18 and connected thereto by any convenient means, such as mechanical fastenings 54.

Preferably, the cross-sectional shape of blade tip inboard end 34 shown in FIG. 4 is symmetric and can be defined by designation NACA 0012 and by the following coordinates:

| X | $Y_U$ | $Y_L$ |
|---|---|---|
| 0 | 0 | −0 |
| 0.5 | — | — |
| 1.25 | 1.894 | −1.894 |
| 2.5 | 2.615 | −2.615 |
| 5.0 | 3.555 | −3.555 |
| 7.5 | 4.200 | −4.200 |
| 10. | 4.683 | −4.683 |
| 15. | 5.345 | −5.345 |
| 20. | 5.737 | −5.737 |
| 25. | 5.941 | −5.941 |
| 30. | 6.002 | −6.002 |
| 40. | 5.803 | −5.803 |
| 50. | 5.294 | −5.294 |
| 60. | 4.563 | −4.563 |
| 70. | 3.664 | −3.664 |
| 80. | 2.623 | −2.623 |
| 90. | 1.448 | −1.448 |
| 95. | 0.807 | −0.807 |
| 100. | 0.126 | −0.126 |

In the above coordinates, X is the chord station represented in percentage of the chord dimension, $Y_U$ is the upper blade airfoil surface location represented in percentage of the chord dimension, and $Y_L$ is the lower blade surface location represented in percentage of chord dimension, and where the leading edge radius is 1.58 percent of the chord dimension taken from a point on the chord. In the preferred embodiment, the outer portion 52 of blade central portion 18 is of corresponding cross section shape, as is the remainder of central portion 18.

The preferred shape for the tip end 36 of blade tip portion 20 shown in FIG. 3 is cambered and may be designated as NACA/S 13006.72 and by the following coordinates:

| X | $Y_U$ | $Y_L$ |
|---|---|---|
| 0.5 | — | — |
| 1.0 | −0.17 | −1.85 |
| 2.0 | +0.27 | −2. |
| 3.0 | +0.64 | −2.13 |
| 4.0 | 0.98 | −2.25 |
| 5.0 | 1.28 | −2.34 |
| 7.5 | 1.86 | −2.51 |
| 10. | 2.23 | −2.64 |
| 12.5 | 2.45 | −2.75 |
| 15. | 2.55 | −2.82 |
| 20. | 2.81 | −2.9 |
| 30. | 2.90 | −3.04 |
| 40. | 2.82 | −3. |
| 50. | 2.57 | −2.77 |
| 60. | 2.21 | −2.40 |
| 70. | 1.77 | −1.91 |
| 80. | 1.29 | −1.34 |
| 90. | 0.73 | −0.75 |
| 95. | 0.41 | −0.44 |
| 100. | 0.08 | −0.10 |

In the above coordinates, X is the zero-lift line station represented in percentage of the maximum chord dimension, $Y_U$ is the upper blade airfoil surface location represented in percentage of the maximum chord dimension, and $Y_L$ is the lower blade surface location represented in percentage of maximum chord dimension, and wherein the leading edge radius is 0.72 percent of the maximum chord dimension drawn from a center which is 0.74 percent of the maximum chord dimension from the zero-lift line station origin and toward the trailing edge and 1.08 percent of the maximum chord dimension below the zero-lift line.

While NACA 0012 is a relatively standard shape and was specifically selected to accomplish ease of connection between the replaceable blade tip portion 20 and the remainder of blade 10, the designation NACA/S 13006-.72 is a highly unique shape designed specifically for the high speed flight instability alleviation function of this invention.

To better understand the designation NACA/S 13006-.72, a somewhat detailed explanation of the significance of these figures will now be given. The first three digits (130) defines blade camber, the fourth and fifth digits (06) defines the blade thickness as a percent of chord dimension, and the final two digits (0.72) represent airfoil leading edge radius. The first three numbers, 130, are used to define the position of maximum camber and the amount of maximum camber to produce the desired coefficient of lift. With respect to the position of maximum camber, the last two digits of the first three digits, 30, are divided by 2 to give the percent chord line or strictly speaking, the zero-lift line, at which the maximum camber is to occur, i.e., 30 ÷ 2 = 15 percent chord line. Accordingly, as best shown in FIG. 3, the maximum camber is to be located at station 60 which is 15 percent of the distance between leading edge 22 and trailing edge 24, that is 15 percent of chord dimension 30. With respect to the amount of maximum camber, we multiply the first digit, i.e., 1 by the fraction 3 20 to get the design lift coefficient of the airfoil section. My equation is therefore 1 × 3 20 = 0.15 (coefficient of lift). In this case, the tip airfoil camber is such that at zero angle of attack with respect to the maximum chord line, the lift coefficient if 0.15.

To understand the significance of the contouring of the blade just described, it will be necessary to understand the high speed instability problem which the blade was designed to alleviate.

Recent years have seen significant increases in the speed, altitude and lifting capabilities of helicopters. As a result of helicopters operating under these greatly extended conditions, a number of aeroelastic phenomena have been encountered which were previously not of concern in helicopter operation. Among these phenomena is a main rotor instability which occurs at high forward speed and which manifests itself as an oscillation of the tip path plane at a frequency that is a submultiple of the main rotor speed. This phenomenon has become known as the "Sub-Multiple Oscillating Track", and is identified by the acronym SMOT. This instability occurs at advancing blade tip Mach numbers above approximately 0.9 and is a constraint on helicopter forward speed potential. During helicopter high speed flight, the advancing blade tips can safely increase in Mach number until a Critical Mach number is arrived at, above which the blade goes into the unstable operation phenomenon identified as SMOT. At and above this Critical Mach number, the airfoil develops a shock wave at the blade tip since the blade tip is operating at maximum radius and hence maximum speed. This shock wave shifts the center of pressure of the tip forward at low angles of attack and then aft or rearward at higher angles of attack. The advancing blade operates at highest Mach number and lowest angle of attack, so the forward shift occurs once per revolution on each blade. The forward movement of this center of pressure produces an unstable moment on the blade tip, which is the cause of the instability of concern, namely, SMOT. If uncorrected, this unstable moment would increase in magnitude with Mach number and angle of attack. It is accordingly my objective to both increase the blade tip speed or Mach number at which this unstable moment creating shock wave occurs, that is, to increase the tip Critical Mach number, and to counteract the unstable moment produced thereby.

A more complete description and analysis of the SMOT phenomena is included in a paper entitled "A Self-Exciting Rotor Blade Oscillation at High Subsonic Mach Number" presented at the 24th National Forum of American Helicopter Society in May of 1968 by William F. Paul of Sikorsky Aircraft.

For a more complete description of the significance of my blade construction and its function of alleviating SMOT, reference will be made to FIG. 5.

FIG. 5 is a plot of the coefficient of blade pitching moment against the blade angle of attack for various blade tip Mach numbers. For the particular blade being demonstrated, it was found that for Mach numbers up to 0.6, the coefficient of blade pitching moment remained substantially on the horizontal coordinate, thereby indicating no significant pitching moment. When the blade was tested at a tip speed of 0.7 Mach, a slight degree of instability set in at angles of attack between 2 and 4 and that a slightly greater degree of stable pitching moment set in above angles of attack of 4. Commencing with the Mach number of 0.75, however, it will be noted that substantial pitching moments of an unstable nature, that is those extending with positive slope in the first quadrant, are encountered. These unstable pitching moments of the blade tip at and above blade tip Mach numbers of 0.75 cause the SMOT phenomenon and their alleviation is the objective of the high speed flight helicopter blade taught herein.

I, in fact, made two changes to the blade tip to abate the SMOT phenomenon. First, I thinned the blade tip as described supra so as to increase the blade tip Critical Mach number. Tip thinning alone within the limits of blade tip cap span (6 percent) was insufficient to fully alleviate the SMOT problem and, accordingly the blade tip was swept back or rearwardly approximately 20° with respect to the remainder of the blade to gain a two-fold benefit. The first of these benefits derived from utilizing the swept tip is that the swept tip experiences a smaller local Mach number than the free stream Mach number because it experiences a Mach number which can be expressed as the product of the free stream Mach number times the cosine of the angle of sweep, which turns out to be 0.94 times local Mach number for a 20° tip sweep. The second advantage to be gained by the blade tip sweep is that the center of pressure of the tip is shifted rearwardly to thereby produce a stable pitching moment at the blade tip to counteract the unstable pitching moment created by the high Mach number.

This second benefit is best illustrated by viewing FIG. 5 and considering that the blade tip is operating at 0.8 Mach number and therefore along curve 70. When this Mach number is reached, the advancing blade commences to operate along the unstable moment line between points 70a and 70b. The 20° swept tip will at the same time be producing a stable moment, that is, a self-correcting moment, which can be represented by line 72 and will serve to cancel the unstable moment between points 70a and 70b.

The third change, the addition of blade tip camber, was made to relieve a blade stall condition experienced by the retreating blades in the high speed flight.

Because of the ease of substituting my specially contoured blade tip for a standard tip without sweep or thinning, I have been able to make a very positive demonstration of the SMOT alleviating capabilities of my blade tip. When the standard blade tip was flown on the blade under test, full SMOT conditions were experienced at an advancing tip Mach number equal to 0.92. When my swept and thinned tips taught herein were tested on the same blade, no SMOT was developed at the same operating conditions, nor even at an advancing tip Mach number of 0.98. In addition to SMOT alleviation, my tests also demonstrated that I achieved 6 to 8 knots higher speed with the rotor performing at the same power level. Further, a surprising amount of noise reduction was experienced using my swept and thinned blade tip. In fact, this blade tip is used on the Sikorsky Aircraft S67 BLACKHAWK™ helicopter and the helicopter cannot be heard in flight until it is almost directly overhead, so that the possibility for an enemy audibly detecting the approach of an aircraft with this type of blade during its target approach operation is significantly reduced.

I wish it to be understood that I do not desire to be limited to the exact details of construction shown and described, for obvious modifications will occur to a person skilled in the art.

I claim:

1. A helicopter blade of selected span and having:
   A. a root portion adapted to be connected to the rotor hub,
   B. a central portion connected to and extending from the root portion and including a section of airfoil cross section and having a chord dimension and a thickness constituting a selected percentage of the chord dimension and constituting the major lift generating surface of the blade,
   C. a tip portion connected to the opposite end of said central portion from said root portion and being swept in the direction opposite to the direction of intended blade rotation from said central portion and having:
      1. an inboard end connected to and having the same cross-sectional shape, chord dimension, and thickness dimension as said airfoil of said central portion,
      2. an outboard or tip end having a chord dimension substantially equal to the inboard end chord dimension and having a thickness substantially one half the thickness of said inboard end thickness, and
      3. having a central section extending between said inboard and said tip ends and being of the same chord dimension thereas and shaped to define a smoothly faired lift surface therebetween.

2. A blade according to claim 1 wherein the sweep of said tip portion is about 20° with respect to said central portion.

3. A blade according to claim 1 wherein said inboard end of said tip portion is of symmetrical airfoil cross section.

4. A blade according to claim 3 wherein the thickness of the tip portion at its inboard end is about 12 percent of the chord dimension and wherein the thickness of the tip portion at its tip end is about 6 percent of the chord dimension.

5. A blade according to claim 3 wherein said tip portion is untwisted.

6. A blade according to claim 5 wherein said tip portion has a span dimension of about 6 percent of the blade span dimension.

7. A blade according to claim 3 wherein said tip end of said tip portion is cambered.

8. A blade according to claim 7 wherein said camber is maximum at the tip end 15 percent chord station.

9. A blade according to claim 8 wherein said camber is of a selected magnitude to produce a design lift coefficient of about 0.15.

10. Apparatus according to claim 1 wherein the blade tip portion outboard end is defined by the coordinates:

| X | $Y_U$ | $Y_L$ |
|---|---|---|
| 0.5 | — | — |
| 1.0 | −0.17 | −1.85 |
| 2.0 | +0.27 | −2. |
| 3.0 | +0.64 | −2.13 |
| 4.0 | 0.98 | −2.25 |
| 5.0 | 1.28 | −2.34 |
| 7.5 | 1.86 | −2.51 |
| 10. | 2.23 | −2.64 |
| 12.5 | 2.45 | −2.75 |
| 15. | 2.55 | −2.82 |
| 20. | 2.81 | −2.9 |
| 30. | 2.90 | −3.04 |
| 40. | 2.82 | −3. |
| 50. | 2.57 | −2.77 |
| 60. | 2.21 | −2.40 |
| 70. | 1.77 | −1.91 |
| 80. | 1.29 | −1.34 |
| 90. | 0.73 | −0.75 |
| 95. | 0.41 | −0.44 |
| 100. | 0.08 | −0.10 |

Where X is the zero-lift line station represented in percentage of the maximum chord, where $Y_U$ is the upper blade airfoil surface represented in percentage of the maximum chord dimension and where $Y_L$ is the lower blade surface represented in percentage of the maximum chord dimension, and wherein said outboard end has a leading edge radius of 0.72 percent of the chord dimension drawn from a position 0.74 percent of the chord dimension from the zero-lift line origin and 1.08 percent of the chord dimension below the zero-lift line, and wherein said inboard end of said tip portion is defined by the coordinates:

| X | $Y_U$ | $Y_L$ |
|---|---|---|
| 0 | 0 | −0 |
| 0.5 | — | — |
| 1.25 | 1.894 | −1.894 |
| 2.5 | 2.615 | −2.615 |
| 5.0 | 3.555 | −3.555 |
| 7.5 | 4.200 | −4.200 |
| 10 | 4.683 | −4.683 |
| 15 | 5.345 | −5.345 |
| 20 | 5.737 | −5.737 |
| 25 | 5.941 | −5.941 |
| 30 | 6.002 | −6.002 |
| 40 | 5.803 | −5.803 |
| 50 | 5.294 | −5.294 |
| 60 | 4.563 | −4.563 |
| 70 | 3.664 | −3.664 |
| 80 | 2.623 | −2.623 |
| 90 | 1.448 | −1.448 |
| 95 | 0.807 | −0.807 |
| 100 | 0.126 | −0.126 |

Where X is the chord station represented in percentage of the chord, where $Y_U$ is the upper blade airfoil surface represented in percentage of the chord dimension, and where $Y_L$ is the lower blade surface represented in percentage of chord dimension, and where the leading edge radius is 1.58 percent of the chord dimension taken from a point on the chord.

11. The method of alleviating an oscillation of the tip path plane of a helicopter main rotor experienced during high forward speed flight at a frequency that is submultiple of the main rotor speed comprising the steps of:
   A. sweeping the blade tip rearwardly with respect to the remainder of the blade,
   B. maintaining the blade tip at constant chord dimension, and
   C. thinning the blade tip substantially uniformly so that the tip outboard end is of substantially one half the thickness of the tip inboard end.

12. The method according to claim 11 wherein the blade tip is swept rearwardly about 20° with respect to the remainder of the blade, wherein the thickness of the inboard end of the blade tip is about 12 percent of tip chord dimension, and wherein the thickness of the outboard end of the blade tip is about 6 percent of the blade tip chord dimension.

13. A helicopter blade adapted for high speed flight having:
   A. a root portion adapted to be connected to the rotor hub,
   B. a central portion connected to and projecting outwardly from the root portion,
   C. an untwisted tip portion of constant chord dimension connected to the end of said central portion opposite the root portion and being swept in a direction opposite to the direction of intended blade rotation from the central portion and being uniformly thinned from its inboard end to its outboard end so that the outboard end is approximately one half the thickness of the inboard end.

14. Apparatus according to claim 13 wherein the sweep of the tip portion is approximately 20° with respect to the central portion, where the thickness of the inboard end and the outboard end of the tip portion are 12 percent and 6 percent of tip portion chord dimension, respectively, and wherein the tip portion has a length or span approximately equal to 6 percent of the blade span.

15. A sweptback tip for a helicopter rotor blade adapted for high speed flight and contoured to sweep rearwardly or in the direction opposite to intended blade rotation when installed including:
   A. an inboard end adapted to be attached to the helicopter blade so that the blade tip sweeps rearwardly with respect to the remainder of the blade and having a selected chord dimension and a selected thickness dimension,
   B. an outboard end constituting the blade tip having a chord dimension equal to the chord dimension of the inboard end and having a thickness equal to one half of the thickness of the inboard end, and
   C. means of uniformly fairing the inboard end to the outboard end.

16. A blade tip according to claim 15 wherein said rearward sweep of the blade tip is approximately 20° with respect to the remainder of the blade, wherein the thickness of the inboard end of the blade tip is approximately 12 percent of the chord dimension, and wherein the thickness of the outboard end of the blade tip is approximately 6 percent of the chord dimension.

17. A blade tip according to claim 16 wherein the chord dimension of the blade tip is constant and the blade tip is untwisted or selectively twisted.

18. A blade tip according to claim 17 wherein the tip inboard end is of symmetrical airfoil cross section.

19. A blade tip according to claim 18 wherein said inboard end is defined by the coordinates:

| X | $Y_U$ | $Y_L$ |
|---|---|---|
| 0 | 0 | −0 |
| 0.5 | — | — |
| 1.25 | 1.894 | −1.894 |
| 2.5 | 2.615 | −2.615 |
| 5.0 | 3.555 | −3.555 |
| 7.5 | 4.200 | −4.200 |
| 10. | 4.683 | −4.683 |
| 15. | 5.345 | −5.345 |
| 20. | 5.737 | −5.737 |
| 25. | 5.941 | −5.941 |
| 30. | 6.002 | −6.002 |
| 40. | 5.803 | −5.803 |
| 50. | 5.294 | −5.294 |
| 60. | 4.563 | −4.563 |
| 70. | 3.664 | −3.664 |
| 80. | 2.623 | −2.623 |
| 90. | 1.448 | −1.448 |
| 95. | 0.807 | −0.807 |
| 100. | 0.126 | −0.126 |

Where X is the chord station represented in percentage of the chord, where $Y_U$ is the upper blade airfoil surface location represented in percentage of the chord dimension, and where $Y_L$ is the lower blade surface location represented in percentage of chord dimension, and where the leading edge radius is 1.58 percent of the chord dimension taken from a point on the chord.

20. A blade tip according to claim 19 wherein said outboard end may be defined by the coordinates:

| X | $Y_U$ | $Y_L$ |
|---|---|---|
| 0.5 | — | — |
| 1.0 | −0.17 | −1.85 |
| 2.0 | +0.27 | −2. |
| 3.0 | +0.64 | −2.13 |
| 4.0 | 0.98 | −2.25 |
| 5.0 | 1.28 | −2.34 |
| 7.5 | 1.86 | −2.51 |
| 10. | 2.23 | −2.64 |
| 12.5 | 2.45 | −2.75 |
| 15. | 2.55 | −2.82 |
| 20. | 2.81 | −2.9 |
| 30. | 2.90 | −3.04 |
| 40. | 2.82 | −3. |
| 50. | 2.57 | −2.77 |
| 60. | 2.21 | −2.40 |
| 70. | 1.77 | −1.91 |
| 80. | 1.29 | −1.34 |
| 90. | 0.73 | −0.75 |
| 95. | 0.41 | −0.44 |
| 100. | 0.08 | −0.10 |

Where X is the zero-lift line station represented in percentage of the maximum chord, where $Y_U$ is the upper blade airfoil surface location represented in percentage of the maximum chord dimension, and where $Y_L$ is the lower blade surface location represented in percentage of the maximum chord dimension, and wherein said outboard end has a leading edge radius of 0.72 percent of the chord dimension drawn from a position 0.74 percent of the chord dimension from the zero-lift line origin and 1.08 percent of the chord dimension below the zero-lift line.

21. Apparatus according to claim 19 wherein said outboard end is cambered to be of maximum camber at the 15 percent chord line and to be of a camber magnitude to produce a design lift coefficient of 0.15.

22. A blade tip according to claim 15 and including a support member extending substantially spanwise through the interior thereof and for substantially the full span of the blade tip, at least one contoured rib member interior of the blade tip and extending substantially parallel to the blade tip chord to maintain the blade tip in the desired shape.

23. The method of alleviating high speed instability in helicopter blades comprising the steps of shaping the blade tip to shift the aerodynamic center rearwardly so as to counterbalance the unstable moment, and thinning the blade tip between its inboard end and its outboard end while maintaining the blade tip chord constant.

24. The method according to claim 23 wherein said blade is thinned uniformly.

25. A helicopter blade designed for high speed flight operation including a root portion, a tip portion, and a central airfoil portion extending therebetween, said tip portion being shaped so that its aerodynamic center is shifted rearwardly from the blade central portion aerodynamic center, said tip portion further being thinned uniformly from its inboard end to its outboard end and being of substantially constant chord dimension.

26. A blade according to claim 25 wherein said blade tip portion is approximately one half as thick at its outboard end as at its inboard end.

27. A blade according to claim 26 wherein said blade inboard end has a thickness of about 12 percent of the chord dimension and wherein said tip portion outboard end has a thickness of about 6 percent of the chord dimension.

* * * * *